United States Patent
Chen et al.

(10) Patent No.: US 12,491,299 B2
(45) Date of Patent: Dec. 9, 2025

(54) BLOOD OXYGENATOR

(71) Applicant: Beihang University, Beijing (CN)

(72) Inventors: Zengsheng Chen, Beijing (CN); Yubo Fan, Beijing (CN); Xiaoyan Deng, Beijing (CN)

(73) Assignee: Beihang University, Beijing (CN)

(*) Notice: Subject to any disclaimer, the term of this patent is extended or adjusted under 35 U.S.C. 154(b) by 301 days.

(21) Appl. No.: 18/384,326

(22) Filed: Oct. 26, 2023

(65) Prior Publication Data
US 2024/0139391 A1 May 2, 2024

(30) Foreign Application Priority Data
Oct. 31, 2022 (CN) .......................... 202211341332.7

(51) Int. Cl.
*A61M 1/16* (2006.01)
*B01D 63/04* (2006.01)

(52) U.S. Cl.
CPC ........ *A61M 1/1698* (2013.01); *A61M 1/1625* (2014.02); *A61M 1/1629* (2014.02); *B01D 63/04* (2013.01); *A61M 2202/0007* (2013.01); *A61M 2202/0028* (2013.01); *A61M 2202/0208* (2013.01); *A61M 2205/02* (2013.01); *Y10S 261/28* (2013.01)

(58) Field of Classification Search
CPC .............. A61M 1/1621; A61M 1/1625; A61M 1/1629; A61M 1/1698; A61M 1/3623; A61M 2202/0007; A61M 2202/0028; A61M 2202/0208; A61M 2205/02; A61M 2206/16
See application file for complete search history.

(56) References Cited

U.S. PATENT DOCUMENTS

| | | | | |
|---|---|---|---|---|
| 4,664,682 A | * | 5/1987 | Monzen | A61M 1/3627 96/219 |
| 2001/0033813 A1 | * | 10/2001 | Filho | A61M 1/3667 422/307 |

* cited by examiner

*Primary Examiner* — Kai H Weng
(74) *Attorney, Agent, or Firm* — CM Law PLLC; Robert C. Klinger

(57) ABSTRACT

Disclosed is a blood oxygenator. The blood oxygenator includes a blood inlet chamber, and a housing. A hollow cavity is arranged in the housing, and includes a heat exchange zone and a gas exchange zone. Multiple heat exchange filaments are arranged in the heat exchange zone. Multiple hollow fibrous membrane fibers are arranged in the gas exchange zone. The blood inlet chamber includes an inverted conical side wall and an end surface hermetically connected to an opening at one end of the inverted conical side wall, an opening at the other end of the inverted conical side wall is hermetically connected to one end of the housing, and the other end of the housing is hermetically connected with a cover body. The cover body is provided with a blood outlet, and the end surface is provided with a spiral liquid inlet pipe coaxial with the blood inlet chamber.

8 Claims, 2 Drawing Sheets

BLOOD OXYGENATOR

CROSS-REFERENCE TO RELATED APPLICATION

This patent application claims the benefit and priority of Chinese Patent Application No. 202211341332.7, filed with the China National Intellectual Property Administration on Oct. 31, 2022, the disclosure of which is incorporated by reference herein in its entirety as part of the present application.

TECHNICAL FIELD

The present disclosure relates to the technical field of medical devices, and in particular to a blood oxygenator.

BACKGROUND

Lung-related diseases seriously threaten human health. For many patients with acute or severe lung failure, conventional drug therapy is ineffective. Extracorporeal membrane oxygenation (ECMO) is the most effective treatment method, which can buy precious time for the rescue and lung function recovery of patients and for patients awaiting lung transplantation. The ECMO system includes an oxygenator, also called artificial lung or membrane lung. The oxygenator can replace the function of lung for blood oxygen exchange to transfer oxygen to venous blood and take carbon dioxide away from venous blood, finally achieving the purpose of changing venous blood into arterial blood.

At present, the blood oxygenator used in clinic is usually a hollow fiber membrane oxygenator, hollow fiber bundles are usually composed of hollow fibers by overlapping. When operating, oxygen flows inside the fiber membrane, while blood flows outside the fiber membrane. Oxygen molecules are diffused from the fiber membrane into the blood for blood oxygenation, and carbon dioxide molecules in the blood are diffuse into the fiber membrane and then taken away. The blood circulation path directly affects the efficacy of the oxygenator. Configuration of the oxygenator decides a blood flow path and flow field distribution in the oxygenator. Optimizing the blood flow path in the oxygenator to obtain a good hemodynamic environment is particularly important for the oxygenator to operate efficiently and reduce complications such as thrombosis. Blood flow disturbance, flow retention, flow reflux dead zone, etc. occurring in the oxygenator is easy to cause thrombosis, affecting the functions of gas exchange and heat exchange of the oxygenator and threatening the health of patients.

At present, there are still many problems in the configuration of commercial oxygenator, e.g., uneven distribution of blood flow on the surface of hollow fibrous membrane fibers inside oxygenator, large flow dead zone, and large resistance of blood flowing through the oxygenator. Due to these problems, the long-term use of membrane oxygenator may easily cause the long-term retention of coagulation factors, leading to thrombosis and the decrease of gas exchange efficiency, and affecting the rehabilitation of patients.

SUMMARY

An objective of the present disclosure is to provide a blood oxygenator, so as to solve the problems in the prior art, improve a blood flow path and gas path of a membrane oxygenator, and avoid the decrease of gas exchange efficiency caused by thrombosis.

In order to achieve the objective above, the present disclosure provides the following solutions: a blood oxygenator is provided, including a blood inlet chamber, and a cylindrical housing. A hollow cavity coaxial with the housing is arranged in the housing, and the hollow cavity includes a heat exchange zone and a blood-oxygen exchange zone which are distributed in sequence in an axial direction of the housing.

Multiple heat exchange filaments are arranged in the heat exchange zone. Each heat exchange filament is provided with a water flow channel, one end of the water flow channel communicates with a water inlet cavity, and the other end of the water flow channel communicates with a water outlet cavity. Multiple hollow fibrous membrane fibers are arranged in the gas exchange zone, one end of each hollow fibrous membrane fiber communicates with a gas inlet cavity, and the other end of the hollow fibrous membrane fiber communicates with a gas outlet cavity.

The blood inlet chamber includes an inverted conical side wall and an end surface, and the end surface is a conical body. The conical body is coaxial with the housing, a side surface of the conical body is smooth, and an apex of the conical body is closer to the heat exchange zone than a bottom surface of the conical body. An edge of a smaller opening end of the inverted conical side wall is hermetically connected to an edge of the end surface, and an opening at the other end of the inverted conical side wall is hermetically connected to one end of the housing, and the other end of the housing is hermetically connected with a cover body. The cover body is provided with a blood outlet, and the blood inlet chamber and the cover body both communicate with the hollow cavity.

The end surface is provided with a spiral liquid inlet pipe coaxial with the blood inlet chamber, one end of the spiral liquid inlet pipe communicates with the blood inlet chamber, and the other end of the spiral liquid inlet pipe communicates with a blood inlet pipe. A length direction of each of the heat exchange filament and the hollow fibrous membrane fiber is perpendicular to the axial direction of the housing. The water inlet cavity, the water outlet cavity, the gas inlet cavity and the gas outlet cavity are isolated from each other in pairs.

Preferably, the water inlet cavity, the water outlet cavity, the gas inlet cavity and the gas outlet cavity are arranged in the housing.

Preferably, the water inlet cavity, the water outlet cavity, the gas inlet cavity and the gas outlet cavity are semi-annular. The water inlet cavity and the water outlet cavity are both located outside the heat exchange zone and flush with the heat exchange zone. The gas inlet cavity and the gas outlet cavity are both located outside the blood-oxygen exchange zone and flush with the blood oxygen exchange zone.

Preferably, the water inlet cavity and the water outlet cavity are separated by a partition plate, and the gas inlet cavity and the gas outlet cavity are separated by a partition plate.

Preferably, the cover body is hemispherical, and an inner cavity of the cover body is a blood outlet buffer zone. The heat exchange zone is closer to the blood inlet chamber than the blood oxygen exchange zone.

Preferably, multiple heat exchange filaments are provided, which are distributed in multiple layers, and all heat exchange filaments are distributed in two or more directions.

Preferably, multiple hollow fibrous membrane fibers are provided, which are distributed in multiple layers, and all hollow fibrous membrane fibers are distributed in two or more directions.

Preferably, the heat exchange filament is made of plastic.

Compared with the prior art, the present disclosure obtains the following technical effects:

The blood oxygenator according to the present disclosure is even in blood flow field, free of flow dead zone, and not prone to thrombosis, thus avoiding the decrease of gas exchange efficiency of the oxygenator caused by thrombosis. As the spiral liquid inlet pipe is arranged in the blood oxygenator, the blood, after passing through the spiral liquid inlet pipe, can rotate around the conical body and is slowly released to enter the blood inlet chamber, and then enters the heat exchange zone and the gas exchange zone. Because a blood flow direction is perpendicular to the heat exchange zone and the gas exchange zone, the flow field is even, and there is no blood flow disturbance dead zone, the blood flowing resistance can be reduced, the thrombosis can be avoided, and the gas exchange efficiency can be improved.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
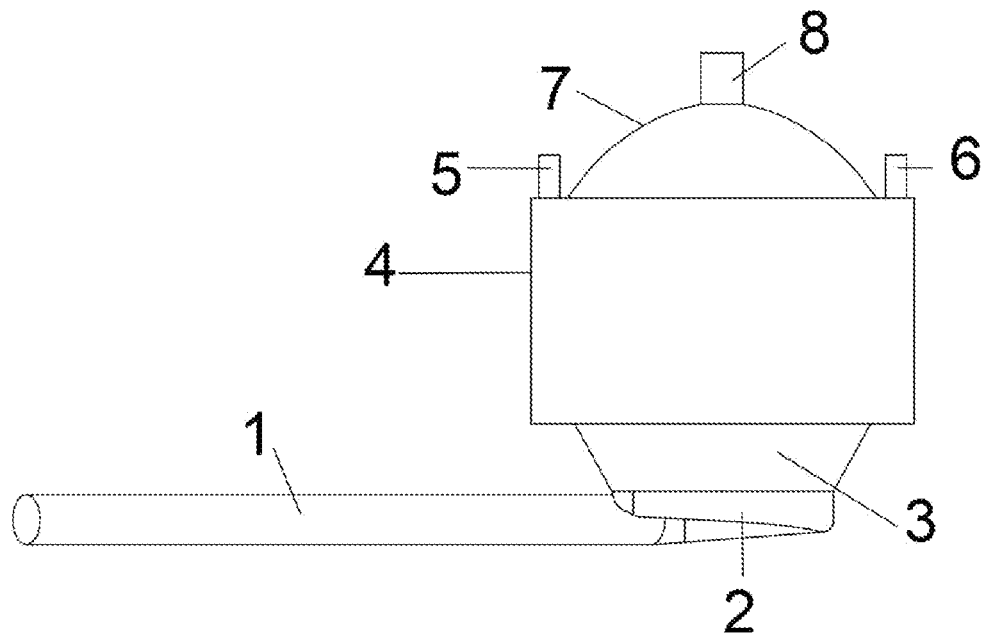
FIG. 1 is a structural schematic diagram of a blood oxygenator according to the present disclosure.

In the drawings: 1—blood inlet pipe; 2—spiral liquid inlet pipe; 3—inverted conical side wall; 4—housing; 5—gas inlet; 6—gas outlet; 7—cover body; 8—blood outlet; 9—conical body; 10—water inlet; 11—water outlet; 12—water inlet cavity; 13—water outlet cavity; 14—heat exchange zone; 15—gas inlet cavity; 16—gas outlet cavity; 17—gas exchange zone; 18—partition plate.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a blood oxygenator, so as to solve the problems in the prior art, improve a blood flow path and gas path of a membrane oxygenator, and avoid the decrease of gas exchange efficiency caused by thrombosis.

To make the objectives, features and advantages of the present disclosure more apparently and understandably, the following further describes the present disclosure in detail with reference to the accompanying drawings and the specific embodiments.

Figure 2:
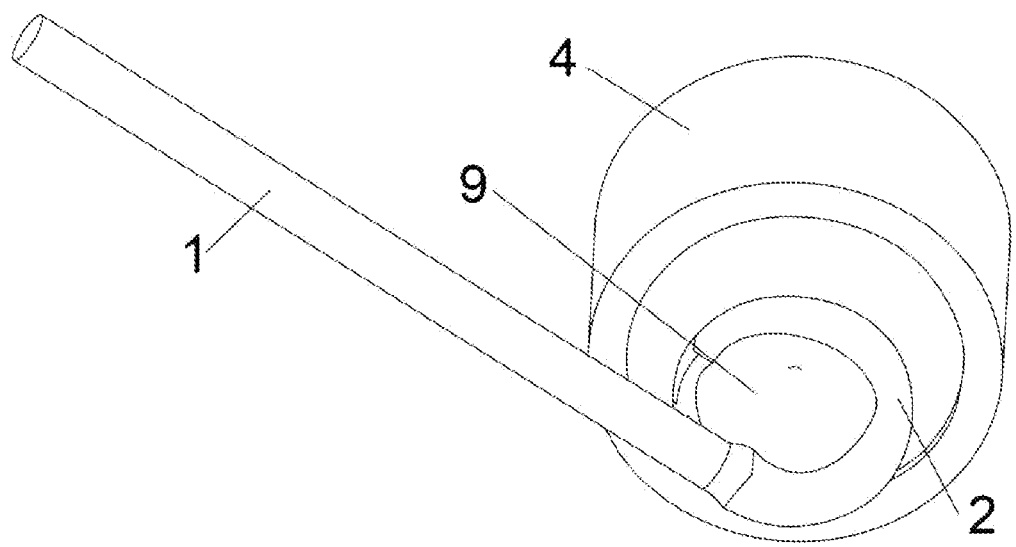
FIG. 2 is a structural schematic diagram of a blood oxygenator according to the present disclosure.
Figure 3:
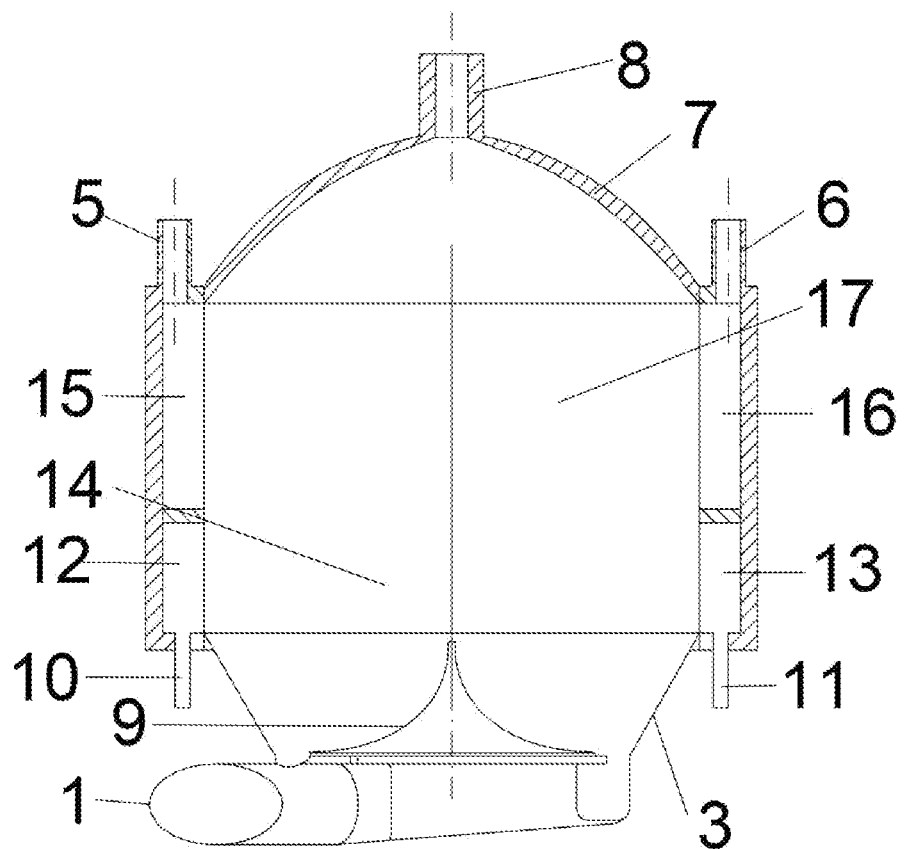
FIG. 3 is a sectional view of a blood oxygenator according to the present disclosure.
Figure 4:
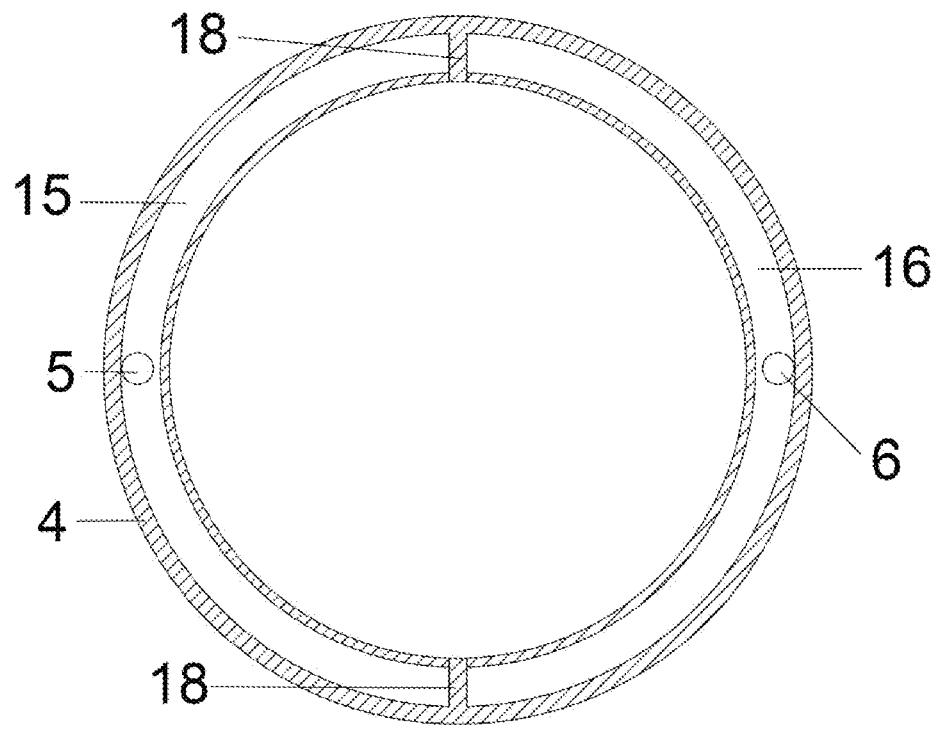
FIG. 4 is a sectional view of a blood oxygenator according to the present disclosure.

As shown in FIG. 1 through FIG. 4, it is provided a blood oxygenator according to this embodiment, including a blood inlet chamber, a hemispherical cover body 7, and a cylindrical housing 4. A hollow cavity coaxial with the housing 4 is arranged in the housing 4, and the hollow cavity is sequentially divided into a heat exchange zone 14 and a gas exchange zone 17 from bottom to top in an axial direction of the housing 4.

The blood inlet chamber includes an inverted conical side wall 3 and an end surface, and the end surface is a conical body 9. The conical body 9 is coaxial with the housing 4, a side surface of the conical body 9 is smooth, and an apex of the conical body 9 is closer to the heat exchange zone 14 than a bottom surface of the conical body 9. An edge of a smaller opening end of the inverted conical side wall 3 is hermetically connected to an edge of the end surface, the other opening end of the inverted conical side wall 3 is hermetically connected to a bottom end of the housing 4, and the blood inlet chamber communicates with one end, away from the blood oxygen exchange zone 17, of the heat exchange zone 14.

A side surface of the conical body 9 is a smooth curved surface, aiming at avoiding blood flow disturbance when the blood rotates and flows around the conical body 9, thus avoiding the stability and evenness of blood flow. In this embodiment, the end surface of the conical body 9 may be understood as being formed by an arc rotating around the axis of the housing 4, such that the side surface of the conical body 9 is arc-shaped concave. The top of the conical body 9 is hemispherical, and such an arrangement makes the blood stably and evenly distributed in the blood inlet chamber.

The end surface is provided with a spiral liquid inlet pipe 2 coaxial with the blood inlet chamber. One end of the spiral liquid inlet pipe 2 communicates with the blood inlet chamber, and the other end of the spiral liquid inlet pipe 2 communicates with a blood inlet pipe 1. The blood inlet pipe 1 is a straight pipe, and a length direction of the blood inlet pipe 1 is tangent to the spiral liquid inlet pipe 2. Venous blood flows into the spiral liquid inlet pipe 2 through the blood inlet pipe 1, and then rotationally flows into the blood inlet chamber through the spiral liquid inlet pipe 2.

Multiple heat exchange filaments are arranged in the heat exchange zone 14, and are distributed in multiple layers in the heat exchange zone 14. A water flow channel is provided in each heat exchange filament, i.e., the heat exchange filament is tubular. One end of the water flow channel communicates with the water inlet cavity 12, and the other end of the water flow channel communicates with the water outlet cavity 13. The water inlet cavity 12 and the water outlet cavity 13 are semi-annular, are arranged in the housing 4, located outside the heat exchange zone 14 and flush with the heat exchange zone 14. The heat exchange zone 14 is located between the water inlet cavity 12 and the water outlet cavity 13, and the water inlet cavity 12 and the water outlet cavity 13 are separated by a partition plate (not shown in figure). The water inlet cavity 12 is provided with a water inlet 10, and the water outlet cavity 13 is provided with a water outlet 11. The water is introduced into the water inlet cavity 12 through the water inlet 10, the water in the water inlet cavity 12 flows into the water flow channel in the heat exchange filament, and then flows into the water outlet cavity 13 after passing through the water flow channel. When the venous blood flows in the heat exchange zone 14, all heat exchange filaments are equivalent to being soaked in the venous blood, the outer walls of the heat exchange filaments are in contact with the venous blood, and the venous blood exchanges heat with the water in the water flow channels in the heat exchange filaments, thus heating or cooling the venous blood in the heat exchange zone 14 and achieving the temperature regulation of the venous blood.

The heat exchange filament is made of biocompatible plastic, e.g., polyethylene glycol terephthalate (PET). It should be noted that all the heat exchange filaments are distributed in two or more directions. That is, the water in the water inlet cavity 12 enters the water outlet cavity 13 via the heat exchange filaments from multiple directions, thus improving heating uniformity.

Multiple hollow fibrous membrane fibers are arranged in the gas exchange zone 17 and are distributed in multiple layers. A gas flow channel is provided in each hollow fibrous membrane fiber, i.e., the hollow fibrous membrane fiber is tubular. One end of the gas flow channel communicates with the gas inlet cavity 15, and the other end of the gas flow channel communicates with the gas outlet cavity 16. The gas inlet cavity 15 and the gas outlet cavity 16 are semi-annular, arranged in the housing 4, located outside the gas exchange zone 17 and flush with the gas exchange zone 17. The gas inlet cavity 15 and the gas outlet cavity 16 are separated by a partition plate 18. The top of the gas inlet cavity 15 is provided with a gas inlet 5, the top of the gas outlet cavity 16 is provided with a gas outlet 6. Oxygen enters the gas inlet cavity 15 from the gas inlet 5, the oxygen in the gas inlet cavity 15 enters the gas flow channel in the hollow fibrous membrane fiber, the blood flows in the blood oxygen exchange zone 17 but is located outside the hollow fibrous membrane fiber, high-concentration oxygen molecules in the hollow fibrous membrane fiber can be diffused into the venous blood, and the carbon dioxide in the venous blood are diffused into the hollow fibrous membrane fibers and taken away, thus achieving the gas exchange functions such as oxygen exchange and carbon dioxide removal, and changing the venous blood into arterial blood.

In this embodiment, a length direction of each of the heat exchange filament and the hollow fibrous membrane fiber is perpendicular to the axial direction of the housing 4. The water inlet cavity 12, the water outlet cavity 13, the gas inlet cavity 15 and the gas outlet cavity 16 are isolated from each other in pairs.

A top end of the housing 4 is hermetically connected to an opening end of the cover body 7, the cover body 7 is provided with a blood outlet 8, and the blood inlet chamber and the cover body 7 both communicate with the hollow cavity of the housing 4. An inner cavity of the cover body 7 is a blood outlet buffer zone, the inner cavity of the cover body 7 is a cavity covered by the cover body 7, and the inner cavity of the cover body 7 communicates with the gas exchange zone 17. The blood flows into the blood outlet buffer zone from the gas exchange zone 17, is buffered at the blood outlet buffer zone, and then flows out from the blood outlet 8 to be pumped into human blood vessels.

It should be noted that all hollow fibrous membrane fibers are distributed in two or more directions. That is, the gas in the gas inlet cavity 15 enters the gas inlet cavity 16 through the hollow fibrous membrane fibers from multiple directions, thus improving the evenness of blood oxygen exchange.

Several examples are used for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A blood oxygenator, comprising a blood inlet chamber, and a cylindrical housing, wherein a hollow cavity coaxial with the housing is arranged in the housing, and the hollow cavity comprises a heat exchange zone and a gas exchange zone which are distributed in sequence in an axial direction of the housing;

a plurality of heat exchange filaments are arranged in the heat exchange zone, a water flow channel is arranged in each heat exchange filament, one end of the water flow channel communicates with a water inlet cavity, and the other end of the water flow channel communicates with a water outlet cavity; a plurality of hollow fibrous membrane fibers are arranged in the gas exchange zone, one end of each hollow fibrous membrane fiber communicates with a gas inlet cavity, and the other end of the hollow fibrous membrane fiber communicates with a gas outlet cavity;

the blood inlet chamber comprises an inverted conical side wall and an end surface, and the end surface is a conical body; the conical body is coaxial with the housing, a side surface of the conical body is smooth, and an apex of the conical body is closer to the heat exchange zone than a bottom surface of the conical body; an edge of a smaller opening end of the inverted conical side wall is hermetically connected to an edge of the end surface, the other opening end of the inverted conical side wall is hermetically connected to one end of the housing, and the other end of the housing is hermetically connected with a cover body; the cover body is provided with a blood outlet, and the blood inlet chamber and the cover body both communicate with the hollow cavity;

the end surface is provided with a spiral liquid inlet pipe coaxial with the blood inlet chamber, one end of the spiral liquid inlet pipe communicates with the blood inlet chamber, and the other end of the spiral liquid inlet pipe communicates with a blood inlet pipe; a length direction of each of the heat exchange filament and the hollow fibrous membrane fiber is perpendicular to the axial direction of the housing; and the water inlet cavity, the water outlet cavity, the gas inlet cavity and the gas outlet cavity are isolated from each other in pairs.

2. The blood oxygenator according to claim 1, wherein the water inlet cavity, the water outlet cavity, the gas inlet cavity and the gas outlet cavity are arranged in the housing.

3. The blood oxygenator according to claim 2, wherein the water inlet cavity, the water outlet cavity, the gas inlet cavity and the gas outlet cavity are semi-annular; the water inlet cavity and the water outlet cavity are both located outside the heat exchange zone and flush with the heat exchange zone, and the gas inlet cavity and the gas outlet cavity are both located outside the gas exchange zone and flush with the blood oxygen exchange zone.

4. The blood oxygenator according to claim 3, wherein the water inlet cavity and the water outlet cavity are separated by a partition plate, and the gas inlet cavity and the gas outlet cavity are separated by a partition plate.

5. The blood oxygenator according to claim 1, wherein the cover body is hemispherical, an inner cavity of the cover body is a blood outlet buffer zone; and the heat exchange zone is closer to the blood inlet chamber than the gas exchange zone.

6. The blood oxygenator according to claim 1, wherein a plurality of heat exchange filaments are provided, the plurality of heat exchange filaments are in multi-layer distribution, and all the heat exchange filaments are distributed in two or more directions.

7. The blood oxygenator according to claim 1, wherein a plurality of hollow fibrous membrane fibers are provided, the plurality of hollow fibrous membrane fibers are in multi-layer distribution, and all the hollow fibrous membrane fibers are distributed in two or more directions.

8. The blood oxygenator according to claim 1, wherein the heat exchange filament is made of plastic.

\* \* \* \* \*